United States Patent
Kachel et al.

(10) Patent No.: US 6,691,060 B2
(45) Date of Patent: Feb. 10, 2004

(54) METHOD AND DEVICE FOR MONITORING WHEEL SPEEDS

(75) Inventors: Gerhard Kachel, Karlsruhe (DE); Thomas Braun, Murr (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/204,832
(22) PCT Filed: Dec. 13, 2001
(86) PCT No.: PCT/DE01/04698
§ 371 (c)(1), (2), (4) Date: Dec. 30, 2002
(87) PCT Pub. No.: WO02/052282
PCT Pub. Date: Jul. 4, 2002

(65) Prior Publication Data
US 2003/0149540 A1 Aug. 7, 2003

(30) Foreign Application Priority Data
Dec. 22, 2000 (DE) .......................................... 100 64 503

(51) Int. Cl.⁷ ............................................... G06F 15/00
(52) U.S. Cl. ........................... 702/142; 702/14; 702/47; 701/70; 701/74
(58) Field of Search .......................... 303/122.06, 150, 303/159; 340/442, 443, 444; 701/20, 29, 72, 86; 702/138, 142, 14, 47; 73/146.2

(56) References Cited

U.S. PATENT DOCUMENTS 3,861,760 A    1/1975   Hamelin
5,562,327 A   10/1996   Fennel et al.
6,223,115 B1 *  4/2001   Batistic ........................ 701/72

FOREIGN PATENT DOCUMENTS

DE    195 21 411    12/1996
DE    198 53 380     1/2000
EP      0 369 179    5/1990

* cited by examiner

Primary Examiner—John Barlow
Assistant Examiner—Stephen J. Cherry
(74) Attorney, Agent, or Firm—Kenyon & Kenyon

(57) ABSTRACT

A method is described for monitoring wheel speeds, having the following steps: determining the wheel speeds, determining the wheel having the maximum wheel speed, determining the wheel having the minimum wheel speed, determining the differential speed between the maximum wheel speed and the minimum wheel speed, and comparing the differential speed to a threshold value, if the differential speed is greater than a threshold value, the wheel having the maximum wheel speed being registered as the fastest wheel and the wheel having the minimum wheel speed being registered as the slowest wheel, in event of a change of the wheel speeds, so that another with wheel is the fastest wheel and/or another wheel is the slowest wheel, the fastest wheel being registered and the slowest wheel being registered and a logical status being established from the registered values and the instantaneous values. A device for monitoring wheel speeds in accordance with the above method is also described.

13 Claims, 1 Drawing Sheet

METHOD AND DEVICE FOR MONITORING WHEEL SPEEDS

FIELD OF THE INVENTION

The present invention relates to a device and method for monitoring wheel speeds.

BACKGROUND INFORMATION

In vehicle safety systems, for example in an electronic stability program (ESP), the rotational speed sensor signals may be elementary input variables. The wheel speeds may be calculated from the rotational speed sensor signals with the aid of additional sensor signals. With the aid of the additional sensor signals, the wheel speeds may be related to the vehicle center of gravity and/or the center of the rear axle. These wheel speeds related to the vehicle center of gravity and/or the center of the rear axle may be exactly monitored for numerous functions, for example, for the ABS function (antilock braking system) or the TCS function (traction control system). It may be required, in particular for the TCS part of the ESP, to monitor the wheel speeds very precisely, since narrow regulation thresholds may be used for these functions.

It may be desirable to recognize faulty signals which, for example, may occur due to incorrect or defective gears or even due to rotational speed sensors falling out or too large a clearance.

According to the related art, the slip of the wheels may be monitored on the basis of a logic which is active above the vehicle reference speed of 18 km/h. At 20 km/h, the difference between the slowest and the fastest wheel speeds may not be greater than 2 km/h. This value may correspond to 10%. At 100 km/h, the difference may not be greater than 5 km/h. This may value correspond to 5%. The permissible differences between 18 km/h and 100 km/h may be linearly extrapolated or interpolated as appropriate. Above 100 km/h, the slip differential between one wheel and the other three wheels may not be greater than 5%.

If the difference is greater than that indicated by the limiting values above, an error counter may be incremented. After a specific time period, for example after 20 seconds, an error may be recognized.

In the conventional logic it may be problematic that monitoring is performed solely on the basis of the slowest and the fastest wheel speeds. Particularly at driving speeds below 100 km/h, robustness problems may therefore occur on uneven roadways or, for example, in deep snow.

SUMMARY OF THE INVENTION

The present invention may be based on an example method that may provide that, if the differential speed is greater than a threshold value, the wheel having the maximum wheel speed is registered as the fastest wheel and the wheel having the minimum wheel speed is registered as the slowest wheel, and in the event of a change in the wheel speed, so that another wheel is the fastest wheel and/or another wheel is the slowest wheel, the fastest wheel is registered and the slowest wheel is registered and a logical status is determined from the registered values and the instantaneous values. This wheel logic may increase the robustness of the monitoring, since monitoring may not be performed solely by the criterion of the slowest and the fastest wheel speed. Rather, it may be registered whether a change of the slowest and/or the fastest wheel occurs. On the basis of the different cases which may occur, a corresponding status may be determined for the logical combinations occurring. On the basis of such a status, a probable number of faulty wheels may then be deduced.

Furthermore, an error counter may be incremented or decremented, respectively, depending on whether and what type of error has occurred.

Status 0 may be recognized if the slowest wheel and/or the fastest wheel have changed more than once. If the slowest wheel and/or the fastest wheel change more than once during monitoring, an improbability may exist, as may occur on a special road section having uneven roadway ("washboard"). However, an actual error may not be assumed for a situation which corresponds to status 0.

Status 1 may be recognized if only the slowest wheel has not changed or if only the fastest wheel has not changed. Therefore, if the slowest or the fastest wheel was always the same wheel up to this point, this may indicate one single faulty wheel.

Status 2 may be recognized if the slowest wheel has changed exactly once and the fastest wheel has changed exactly once. In the event of status 2, two faulty wheels may therefore probably exist.

Furthermore, status 3 may be recognized if the slowest wheel has not changed and the fastest wheel has not changed. In such a situation, one or two faulty wheels are assumed.

An error counter may be decremented for status 0. Since an error may not be assumed at status 0—it may be a coincidence if an error simultaneously existed upon recognizing status 0—an error counter is decremented. If the error counter is reset to 0 due to this decrementing of the error counter, the registered wheels may be erased. Subsequently, the wheel logic may be reinitialized.

An error counter may be incremented by 2 for status 1 and status 3. After a specific time period, for example after 20 seconds, an error may therefore be recognized.

An error counter may be incremented by 1 for status 2. For status 2, an error may therefore be recognized after, for example, 40 seconds.

It may be useful that the wheel speeds are determined from rotational speed sensor signals and additional sensor signals. Through the combination of the signals the wheel speeds may be determined in relation to the vehicle center of gravity and/or the center of the rear axle, which may be particularly well suited for monitoring.

According to the example method of the present invention, the differential speed may be compared to a relative threshold value. For example, the relative threshold value may be 5% over the entire speed range between 20 km/h and 100 km/h.

However, below a speed threshold, the differential speed may be compared to an absolute threshold value. The speed threshold, below which a constant value is used, may be, for example, 40 km/h, a differential speed threshold of, for example, 2 km/h between the slowest and the fastest wheel being the criterion for initiating monitoring with the aid of the wheel logic according to the present invention.

The present invention may be based on an example device that may provide that, if the differential speed is greater than a threshold value, the wheel having the maximum wheel speed is. registered as the fastest wheel and the wheel having the minimum wheel speed is registered as the slowest wheel, and in the event of a change in the wheel speed, so that another wheel is the fastest wheel and/or another wheel is the slowest wheel, the fastest wheel is registered and/or the slowest wheel is registered and a logical status is determined from the registered values and the instantaneous values. Using this example device, an example method according to the present invention may be implemented.

The present invention may be based on the recognition that by introducing a wheel logic, monitoring having improved robustness may be made available. This may particularly relate to the monitoring of traction control on special road sections ("washboard") or in the event of other special roadway conditions, for example in deep snow.

DETAILED DESCRIPTION

Figure 1:
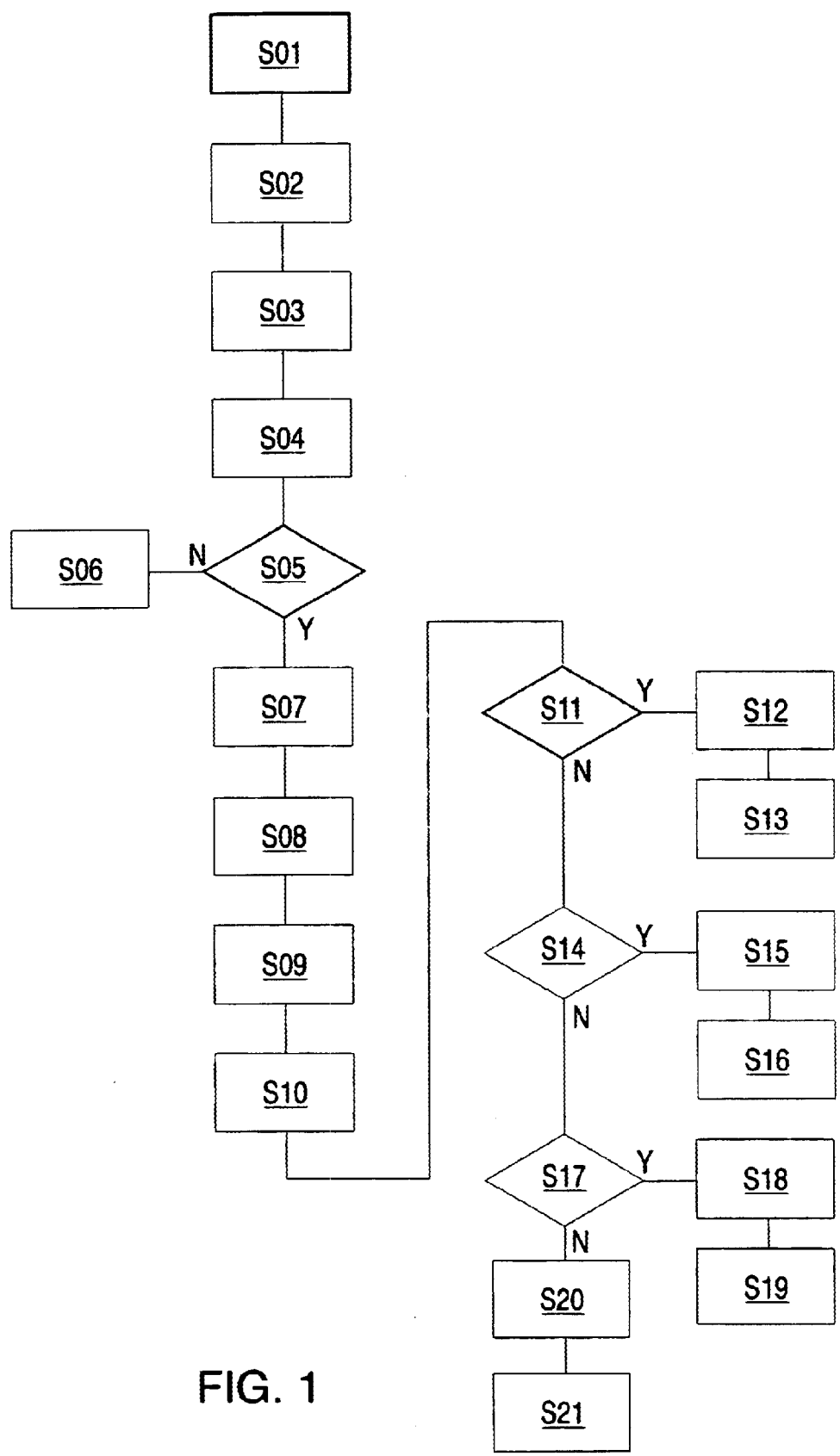
FIG. 1 shows a flowchart for explaining an example method according to the present invention.

FIG. 1 shows a flowchart to explain an example method according to the present invention. The symbols for indicating the method steps have the following meanings:

S01: Determining the wheel speeds.
S02: Determining the wheel having the maximum wheel speed.
S03: Determining the wheel having the minimum wheel speed.
S04: Determining the differential speed between the maximum wheel speed and the minimum wheel speed.
S05: Differential speed greater than threshold value?
S06: No activation of the wheel logic.
S07: Registration of the wheel having the maximum wheel speed.
S08: Registration of the wheel having the minimum wheel speed.
S09: In the event of a change of the wheel having the maximum wheel speed: registration of the wheel having the maximum wheel speed.
S10: In the event of a change of the wheel having the minimum wheel speed: registration of the wheel having the minimum wheel speed.
S11: Wheel having maximum wheel speed AND wheel having minimum wheel speed always the same up to this point?
S12: Recognition of status 3.
S13: Increment error counter by 2.
S14: Wheel having maximum wheel speed OR wheel having minimum wheel speed always the same up to this point?
S15: Recognition of status 1.
S16: Increment error counter by 2.
S17: Single change of the wheel having minimum wheel speed AND single change of the wheel having maximum wheel speed?
S18: Recognition of status 2.
S19: Increment error counter by 1.
S20: Recognition of status 0.
S21: Decrement error counter.

In step S01, the wheel speeds of the wheels of a vehicle are determined. These speeds may be established from the rotational speed sensor signals with the aid of additional sensor signals, so that ultimately wheel speeds which are related to the vehicle center of gravity and/or the center of the rear axle are determined.

In step S02, the wheel having the maximum wheel speed is determined. In step S03, the wheel having the minimum wheel speed is determined. The sequence of steps S02 and S03 may be arbitrary.

In step S04, the differential speed between the maximum wheel speed and the minimum wheel speed is now determined.

In step S05, it is checked whether the differential speed determined in step S04 is greater than a predetermined threshold value. For example, in a speed range between 20 km/h and 100 km/h, it may be monitored whether a relative speed differential is exceeded, for example, whether the speeds of the wheel having the maximum wheel speed and the wheel having the minimum wheel speed deviate from one another by more than 5% in relation to the maximum wheel speed. Below an adjustable speed threshold, for example below 40 km/h, an absolute differential speed between the slowest and the fastest wheel may be monitored, using a threshold value of 2 km/h, for example.

If the threshold is not exceeded, then the wheel logic is not activated (step S06).

If, however, the differential speed is greater than the threshold value, then the wheel having the maximum wheel speed is registered in step S07. In step S08, the wheel having the minimum wheel speed is registered. The sequence of steps S07 and S08 is again arbitrary.

If the wheel having the maximum wheel speed now changes, i.e., another wheel now has the maximum wheel speed, this wheel is registered in step S09. Similarly, in the event of a change of the wheel having the minimum wheel speed, i.e., another wheel now has the minimum wheel speed, this wheel is registered in step S10. The sequence of steps S09 and S10 may be arbitrary.

In step S11, it is now checked in the framework of the wheel logic according to the present invention whether the wheel having the maximum wheel speed and the wheel having the minimum wheel speed were always the same until now. If this question is answered with yes, this means that no change of the wheel having the minimum wheel speed and the wheel having the maximum wheel speed has occurred, so logical status 3 is recognized in step S12. In step S13 the error counter is incremented by 2.

If the question from step S11 is answered with no, then it is checked in step S14 whether the wheel having the maximum wheel speed or the wheel having the minimum wheel speed was always the same until now. If this question is answered with yes, this means that one and only one of the wheels having the maximum wheel speed or the minimum wheel speed, has not changed, therefore, status 1 is recognized in step S15. In step S16, the error counter is again incremented by 2.

If the question from step S14 is answered with no, then it is checked in step S17 whether a single change of the wheel having the slowest wheel speed has occurred and, in the same way, whether a single change of the wheel having the maximum wheel speed has occurred. If this question is answered with yes, then status 2 is recognized in step S18 and the error counter is incremented in step S19 by 1.

If the question from step S17 is answered with no, then status 0 is recognized in step S20. This status 0 represents an impossibility, such as may occur on a special road section ("washboard"). An error may not be assumed in the event of status 0. In step S21, the error counter is decremented.

If status 1 was recognized, then there may be one single malfunctioning wheel. In the event of status 2, there may be two malfunctioning wheels, and in the event of status 3, one may assume one or two malfunctioning wheels. After a specific time period, for example, 20 seconds in the event of status 1 and 3 or 40 seconds in the event of status 2, respectively, a malfunction is recognized. In contrast, if status 0 was recognized and the error counter was therefore decremented, the stored wheel index is erased if the error counter is again at 0. The wheel logic is reinitialized.

The preceding description of the example embodiments according to the present invention is only used for illustrative purposes and not for the purpose of restricting the present invention. Various changes and modifications may be possible in the framework of the present invention without leaving the scope of the present invention and its equivalents.

What is claimed is:

1. A method for monitoring wheel speeds of a plurality of wheels, comprising:

determining the plurality of wheel speeds;

determining a wheel having a maximum wheel speed;

determining a wheel having a minimum wheel speed;

determining a differential speed between the maximum wheel speed and the minimum wheel speed;

comparing the differential speed to a threshold value;

if the differential speed is greater than the threshold value, registering the wheel having the maximum wheel speed as a fastest wheel and the wheel having the minimum wheel speed as a slowest wheel;

if a change in the plurality of wheel speeds occurs so that another wheel is one of a current fastest wheel and a current slowest wheel, registering the current fastest wheel and the current slowest wheel; and establishing a logical status from the registered values and instantaneous wheel speed values, the logical status being related to a change in at least one of the fastest wheel and the slowest wheel.

2. The method according to claim 1, wherein a logical status zero is recognized if at least one of the slowest wheel and the fastest wheel has changed more than once.

3. The method according to claim 2, further comprising:

decrementing an error counter if the logical status zero is recognized.

4. The method according to claim 1, wherein a logical status one is recognized if one of only the slowest wheel has not changed and only the fastest wheel has not changed.

5. The method according to claim 4, further comprising:

incrementing an error counter by two if the logical status one is recognized.

6. The method according to claim 4, further comprising:

incrementing an error counter by two if the logical status three is recognized.

7. The method according to claim 1, wherein a logical status two is recognized if the slowest wheel has changed exactly once and the fastest wheel has changed exactly once.

8. The method according to claim 1, wherein a logical status three is recognized if the slowest wheel has not changed and the fastest wheel has not changed.

9. The method according to claim 1, further comprising:

incrementing an error counter by one if the logical status two is recognized.

10. The method according to claim 1, wherein the plurality of wheel speeds are determined from rotational speed sensor signals and additional sensor signals.

11. The method according to claim 1, wherein the differential speed is compared to a relative threshold value.

12. The method according to claim 1, wherein, below a predetermined threshold speed, the differential speed is compared to an absolute threshold value.

13. A device for monitoring wheel speeds of a plurality of wheels, comprising:

a first arrangement for determining the plurality of wheel speeds;

a second arrangement for determining a wheel having a maximum wheel speed;

a third arrangement for determining a wheel having a minimum wheel speed;

a fourth arrangement for determining a differential speed between the maximum wheel speed and the minimum wheel speed; and a fifth arrangement for comparing the differential speed to a threshold value, wherein:

if the differential speed is greater than a threshold value, the wheel having the maximum wheel speed is registered as the fastest wheel and the wheel having the minimum wheel speed is registered as the slowest wheel;

if a change in the plurality of wheel speeds occurs so that another wheel is one of a current fastest wheel and a current slowest wheel, the current fastest wheel is registered and the current slowest wheel is registered; and a logical status is established from the registered values and instantaneous wheel speed values, the logical status being related to a change in at least one of the fastest wheel and the slowest wheel.

* * * * *